United States Patent [19]

Nakagawa et al.

[11] 4,205,335
[45] May 27, 1980

[54] CIRCUIT ARRANGEMENT FOR SEPARATING CHROMINANCE AND LUMINANCE INFORMATION IN A COMPOSITE VIDEO SIGNAL OF AN NTSC SYSTEM

[75] Inventors: Isao Nakagawa, Yokohama; Hiroaki Nabeyama, Kamakura; Tomomitsu Kuroyanagi, Yokohama, all of Japan

[73] Assignee: Hitachi, Ltd., Japan

[21] Appl. No.: 888,657

[22] Filed: Mar. 21, 1978

[30] Foreign Application Priority Data

Mar. 24, 1977 [JP] Japan .................. 52-31543

[51] Int. Cl.² .................. H04N 9/535; H04N 9/50
[52] U.S. Cl. ............................... 358/31; 358/23
[58] Field of Search ............ 358/31, 36, 39, 40, 358/23

[56] References Cited

U.S. PATENT DOCUMENTS

| 3,707,596 | 12/1972 | Kuhn | 358/31 |
| 4,074,321 | 2/1978 | Miller | 358/31 |

Primary Examiner—John C. Martin
Attorney, Agent, or Firm—Craig and Antonelli

[57] ABSTRACT

A color signal processing circuit comprising a first bandpass filter for extracting a modulated color signal from a composite video signal, a first comb filter having two charge transfer devices and a subtractor for providing a first sampled color signal, a second comb filter having two charge transfer devices and a subtractor for providing a second sampled color signal, an adder circuit for arithmetically determining a sum of the first and second sampled color signals, a second bandpass filter for reproducing only the modulated color signal from the sum of the first and second sampled color signals, and a subtraction circuit for arithmetically determining a difference signal between the composite video signal and an output signal from the second bandpass filter, so that first and second demodulated color signal outputs utterly free of a luminance signal component are obtained from the first and second comb filters respectively through a low pass filter while a luminance signal output is obtained from the subtraction circuit which is utterly free of a color signal component, whereby the prevention of the cross-color phenomenon as well as the dot interference can be achieved.

2 Claims, 4 Drawing Figures

F I G. 4
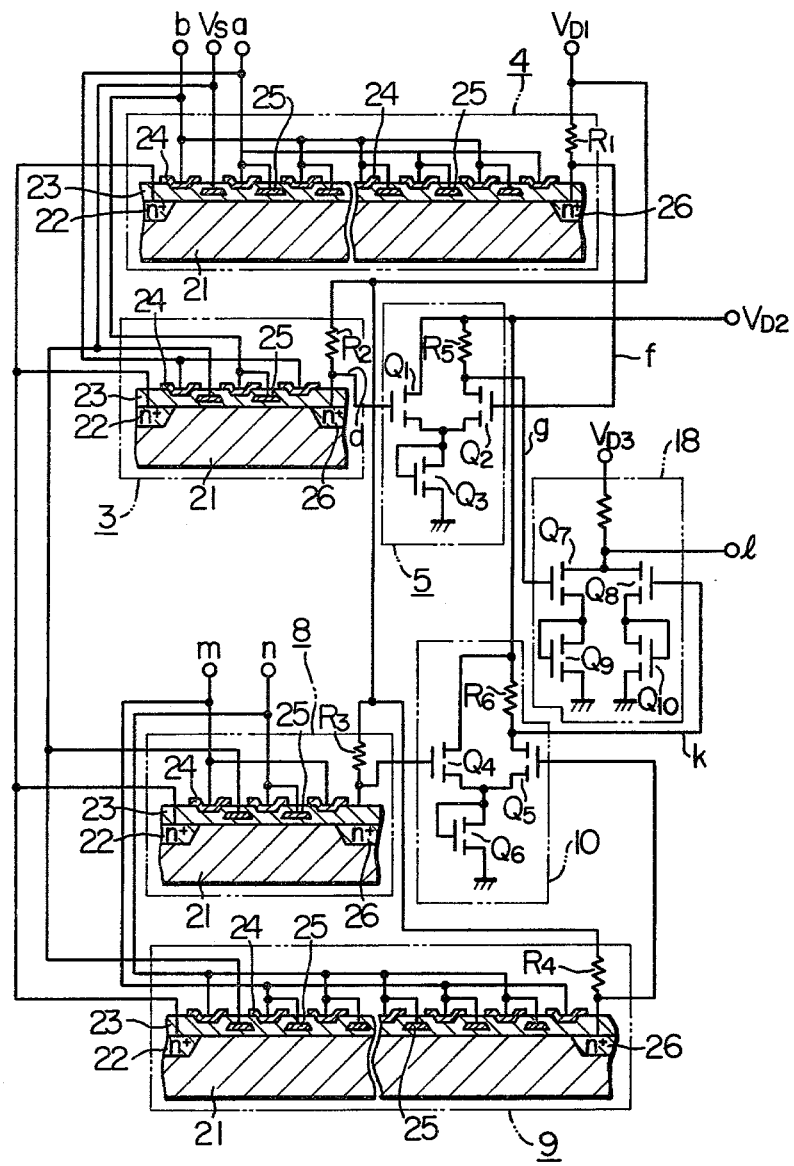

CIRCUIT ARRANGEMENT FOR SEPARATING CHROMINANCE AND LUMINANCE INFORMATION IN A COMPOSITE VIDEO SIGNAL OF AN NTSC SYSTEM

LIST OF THE PRIOR ART REFERENCES (37CFR 1.56 (a)]

The following are cited to show the state of the art:
1. Japanese Patent Laid-Open Publication No. 7628/77.
2. Japanese Patent Laid-Open Publication No. 115731/76.

BACKGROUND OF THE INVENTION

The present invention relates to a color signal processing circuit for separating a modulated color signal and a luminance signal from a composite video signal and demodulating the video signal.

In the hitherto known television receiver of NTSC color television system, separation of the modulated color signal from the composite video signal is generally effected either by using a bandpass filter or through subtraction between a composite video signal and the one delayed therefrom for a single horizontal scanning period (hereinafter represented simply by 1H). Although the separation of the modulated color signal through the bandpass filter is most familiar at present, it suffers from a so-called cross-color phenomenon in which high frequency components of the luminance signals are undesirably mixed in the modulated color signal, as a result of which an image region which inherently consists of fine stripes in white and black, for example, is stained to give a remarkably unnatural appearance. In the latter case, a comb filter is employed which is immune to the cross-color phenomenon. However, when the delay lines constituted by LC-elements or ultrasonic delay lines are used for the comb filter, there arises a problem of instability due to temperature change. The use of a single charge transfer device (hereinafter referred to also as CTD) on the other hand requires disadvantageously a high frequency clock signal as well as an increased number of CTD stages. As an attempt to avoid these drawbacks, there has been proposed a comb filter circuit in which two CTD's are used with the subcarrier signal being utilized as the clock signal. A typical example of a color demodulator circuit which includes a pair of such comb filters in combination is shown in FIG. 1 in a block diagram in FIG. 1 of the accompanying drawings. In FIG. 1, reference numeral 1 denotes a bandpass filter. A broken line block 2 indicates a first comb filter circuit which comprises a first CTD 3, a second CTD 4 providing a delay time longer by 1H than that of the first CTD, and a first subtractor 5. Numeral 6 denotes a first low-pass filter. A broken line block 7 represents a second comb filter circuit which is constituted by a third CTD, a fourth CTD providing a delay time longer by 1H than that of the third CTD and a second subtractor 10. Numeral 11 denotes a second low-pass filter. The color demodulator circuit further includes a color synchronous circuit 12, a first frequency multiplier 13, a first clock pulse generator 14, a phase shifter 15, a second frequency multiplier 16 and a second clock pulse generator 17. FIG. 2 shows waveforms of signal at various circuit points in the color demodulator circuit shown in FIG. 1 to illustrate the operation thereof. Upon separation of modulated color signals from the composite video signal at the bandpass filter 1, high frequency components of the luminance signal in the frequency band of the modulated color signal will be simultaneously eliminated. A continuous subcarrier signal having a phase difference of 90° relative to the phase of the color burst signal is reproduced at the color synchronous circuit 12 from the color burst signal in the modulated color signal which is separated from the composite video signal. The frequency of the subcarrier signal is multiplied by a factor of 2 at the first frequency multiplier 13 and then divided by the clock pulse generator 14 thereby to produce clock pulse signals having a frequency of the subcarrier signal and being out-of-phase from each other by 180°, as shown at (a) and (b) in FIG. 2. These clock pulse signals are utilized for driving the first and second CTD's 3 and 4. Through the first CTD 3, input signal is sampled at the time point of the falling or trailing edge of the clock pulse signal (a). Since the input signal to the first CTD 3 is such a modulated color signal as shown at (c) in FIG. 2, the output from the first CTD 3 will be such a sampled color signal as shown at (d) in FIG. 2, provided that the time delay at the first CTD 3 is neglected. Further, because of longer delay time of the second CTD by 1H than the first CTD 3, the output signal from the second CTD 4 is delayed for the duration of 1H relative to the output signal from the first CTD 3. Since the modulated color signal has an interleave frequency relative to that of the luminance signal, the preceding signal in advance of 1H will be such as shown by the waveform (e) in FIG. 2. The second CTD 4 is driven by a clock signal of the opposite phase to the clock signal for driving the first CTD 3, and the input signal to the second CTD 4 is sampled at the time point of the leading edge of the clock pulse shown at (b) in FIG. 2. Since the clock pulse frequency is equal to that of the subcarrier signal interleaving the luminance signal frequency, the sampling at the second CTD 4 is effected at a time point delayed by 1H relative to the time point of the sampling at the first CTD 3. Thus, the output signal from the second CTD 4 will be such a sampled signal as shown at (f) in FIG. 2.

A signal (g) can be obtained by subtracting the output signal of the second CTD 4 from that of the first CTD 3. Application of the signal (g) to the low-pass filter 6 will result in the output signal (h) shown in FIG. 2, which corresponds to a demodulated signal of the modulated signal (c) in FIG. 2 at the trailing edge (phase) of the clock pulse (a). Accordingly, when the trailing phase of the clock pulse (a) shown in FIG. 2 is set so as to be equal to the axis (R-Y), then the demodulated (R-Y) signal can be obtained at the output of the low-pass filter 6.

The luminance signal in the frequency band of the modulated color signal is concentrated on a frequency equal to an integral multiplication of the horizontal repetition frequency. Accordingly, if the signal (c) of FIG. 2 is the luminance signal, the signal (c) before undergoing the delay of 1H will be of the same waveform as the signal (e), as is shown at (i) in FIG. 2, which means that the output signal from the second CTD 4 shown at (j) in FIG. 2 is substantially same as the waveform (d). Thus, subtraction of the output of the second CTD 4 from the output of the first CTD 3 at the subtractor 5 will result in approximately zero output. In this manner, it is possible to obtain the demodulated (R-Y) signal having no luminance signal components from the modulated color signal mixed with the luminance signal. By phase-shifting the subcarrier signal to the axis (B-Y) through the phase shifter 15, it is possible to obtain the demodulated (B-Y) signal having no luminance signal components through operation of the comb filter 7 in the similar manner as the first comb filter 2 described above.

With the circuit arrangement shown in FIG. 1, it is thus possible to separate the luminance signal component from the color signal component. However, this circuit is inoperative for the elimination of the modulated color signal from the luminance signal. In other words, the above described comb filter circuit is intended to be inserted in the color signal channel and can not be applied to the luminance signal channel. Besides, since the output signal from the comb filter circuit is the sampled color signal which includes a demodulated color signal and some harmonics thereof it is impossible to eliminate the modulated color signal superposed on the luminance signal with the aid of the output signal from the comb filter circuit. Accordingly, a so-called dot interference which occurs due to the fact that the color signal is inputted to the color CRT through the luminance signal channel, can not be obviated. In this respect, it can be said that the operation of the comb filter circuit is unsatisfactory as compared with the prior known filter circuit employing the delay lines of RC-elements.

SUMMARY OF THE INVENTION

Accordingly, an object of the invention is to provide a color signal processing circuit incorporating the comb filter circuitry which avoids the drawbacks of the hitherto known circuit as described above and is capable of eliminating the modulated color signal in the luminance signal channel thereby to suppress effectively also the occurrence of the dot interference.

With the above object in view, the invention teaches that the original composite video signal is perfectly reproduced by making use of the output signal from a comb filter which is a sampled signal prior to being inputted to a low-pass filter and contains color signal components in the frequency band of the subcarrier signal, and that the modulated color signal component in the luminance signal channel is cancelled out by the reconstructed modulated color signal from which the luminance signal component has been eliminated through the comb filter circuit, thereby to improve the operation of the luminance signal channel.

BRIEF DESCRIPTION OF THE DRAWINGS

FIG. 4 shows a circuit diagram of a main portion of the embodiment shown in FIG. 3.

DESCRIPTION OF THE PREFERRED EMBODIMENTS

Figure 1:
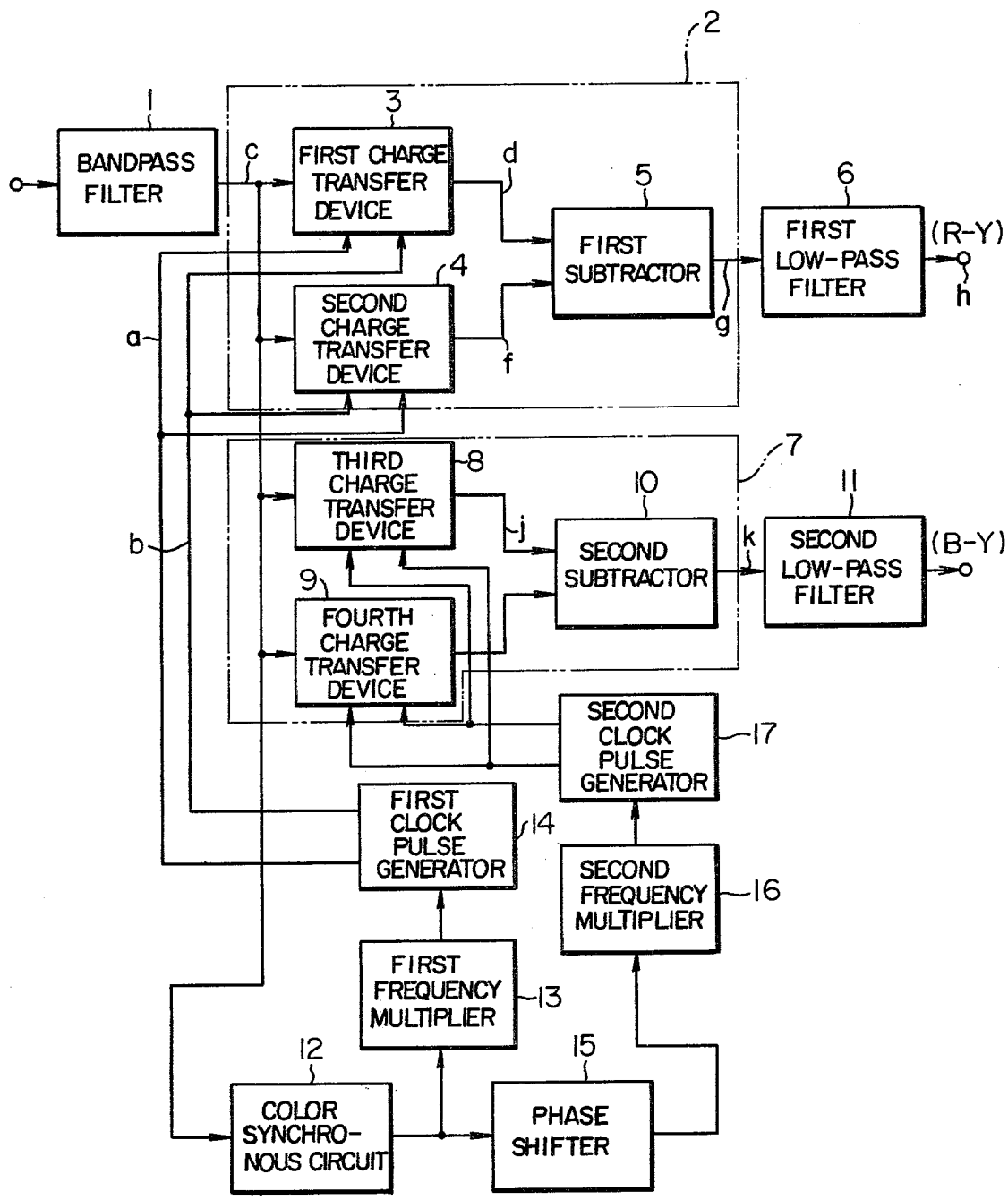
FIG. 1 is a block diagram showing a hitherto known color demodulator circuit.

Now, the invention will be described in detail in conjunction with an exemplary embodiment shown in FIG. 3, in which reference numerals 1 to 17 denote the same components as those shown in FIG. 1. The circuit of FIG. 3 further includes an adder circuit for adding together the outputs from the comb filter circuits 2 and 7, a bandpass filter 19 to which the output from the adder circuit 18 is inputted and a subtraction circuit 20 for subtracting the output signal of the bandpass filter 19 from the original composite video signal. As described hereinbefore, the output signal from the comb filter circuit 2 is the signal (g) shown in FIG. 2 as sampled along the axis (R-Y), while the output from the comb filter 7 is the signal (k) shown in FIG. 2 as sampled along the axis (B-Y). By simply adding together the sampled color signals shown at (g) and (k) in FIG. 2, a signal shown at (l) in FIG. 2 can be obtained. When signal in the frequency band of the demodulated color signal is separated from the signal (l) through the bandpass filter 19, there can be obtained the modulated color signal shown at (c) in FIG. 2. By selecting characteristics in the frequency band of the reconstructed modulated color signal such that the amplitude characteristic of the bandpass filter 1 is cancelled out and that the overall characteristic of the bandpass filters 1 and 19 has a flat amplitude characteristic and a linear phase characteristic, the same modulated color signal as that of the luminance signal channel can be reproduced, whereby the modulated color signal in the luminance signal channel can be cancelled out by the reproduced or reconstructed modulated color signal thereby to suppress the dot interference.

In the following, detailed description will be made on the reconstruction of the modulated color signal with the aids of mathematical expressions.

In general, the modulated color signal E(t) appearing at the output of the bandpass filter 1 may be expressed as follows:

$$E(t) = E_c(t) \cos \omega_{sc}t + E_s(t) \sin \omega_{sc}t \tag{1}$$

where $E_c(t)$ and $E_s(t)$ represent base band signals and $\omega_{sc}$ is an angular frequency of the subcarrier signal when the modulated color signal E(t) is sampled at a time interval $2\pi/\omega_{sc}$, the resulting sampled signal $E_1(t)$ can be given by:

$$E_1^*(t) = \sum_{n=-\infty}^{\infty} E(t)\delta(t - n\frac{2\pi}{\omega_{sc}}) \tag{2}$$

$$= \sum_{n=-\infty}^{\infty} [E_c(n\frac{2\pi}{\omega_{sc}}) \cos(\omega_{sc} \cdot n\frac{2\pi}{\omega_{sc}})\delta(t - n\frac{2\pi}{\omega_{sc}})$$

$$+ E_s(n\frac{2\pi}{\omega_{sc}}) \sin(\omega_{sc} \cdot n\frac{2\pi}{\omega_{sc}})\delta(t - n\frac{2\pi}{\omega_{sc}})]$$

$$= \sum_{n=-\infty}^{\infty} E_c(\frac{2n\pi}{\omega_{sc}})\delta(t - \frac{2n\pi}{\omega_{sc}})$$

When the signal E(t) is sampled with a phase difference of 90° relative to the sampling phase for the signal $E_1^*(t)$, the resulting sampled signal $E_2^*(t)$ may be given by the following expression:

$$E_2^*(t) = \sum_{n=-\infty}^{\infty} E_s(\frac{2n\pi}{\omega_{sc}} + \frac{2\pi}{4\omega_{sc}})\delta(t - \frac{2n\pi}{\omega_{sc}} - \frac{2\pi}{4\pi\omega_{sc}}) \tag{3}$$

Accordingly, when Fourier transformations of $E_c(t)$ and $E_s(t)$ are represented by $F_c(\omega)$ and $F_s(\omega)$, respectively, then respective Fourier transformations $F_1^*(\omega)$ and $F_2^*(\omega)$ for $E_1^*(t)$ and $E_2^*(t)$ can be given by the following expressions (4) and (5):

$$F_1^*(\omega) = \sum_{n=-\infty}^{\infty} F_c(\omega + n\omega_{sc}) \tag{4}$$

$$F_2^*(\omega) = \sum_{n=-\infty}^{\infty} e^{j\frac{n\pi}{2}} F_s(\omega + n\omega_{sc}) \quad (5)$$

Because the bandwidth of the modulated color signal is sufficiently narrow, signal $F_1(\omega)$ of a frequency in the vicinity of the angular frequency of $\pm\omega_{sc}$ as extracted from the signal $F_1^*(\omega)$ can be given by:

$$F_1(\omega) = F_c(\omega - \omega_{sc}) + F_c(\omega + \omega_{sc}) \quad (6)$$

The above expression (6) is anything but the Fourier transformation for $E_c(t)\cos\omega_{sc}t$.

In a similar manner, signal $F_2(\omega)$ of the following expression (7) can be extracted from the signal $F_2^*(\omega)$ at a frequency in the vicinity of the angular frequency of $\pm\omega_{sc}$.

$$F_2(\omega) = j[F_s(\omega - \omega_{sc}) - F_s(\omega + \omega_{sc})] \quad (7)$$

The above expression (7) is utterly same as the Fourier transformation for $E_s(t)\sin\omega_{sc}t$.

Accordingly, when the output signals from the subtractors 5 and 10 are added together, then the signal $E(t) = E_c(t)\cos\omega_{sc}t + E_s(t)\sin\omega_{sc}t$ can be reproduced at a frequency in the vicinity of $\omega_{sc}$, which means that the reproduced signal in the frequency band of the modulated color signal as extracted by correcting the frequency characteristic of the bandpass filter 1 through the bandpass filter 19 is utterly same as the modulated color signal in the luminance signal channel.

Figure 2:
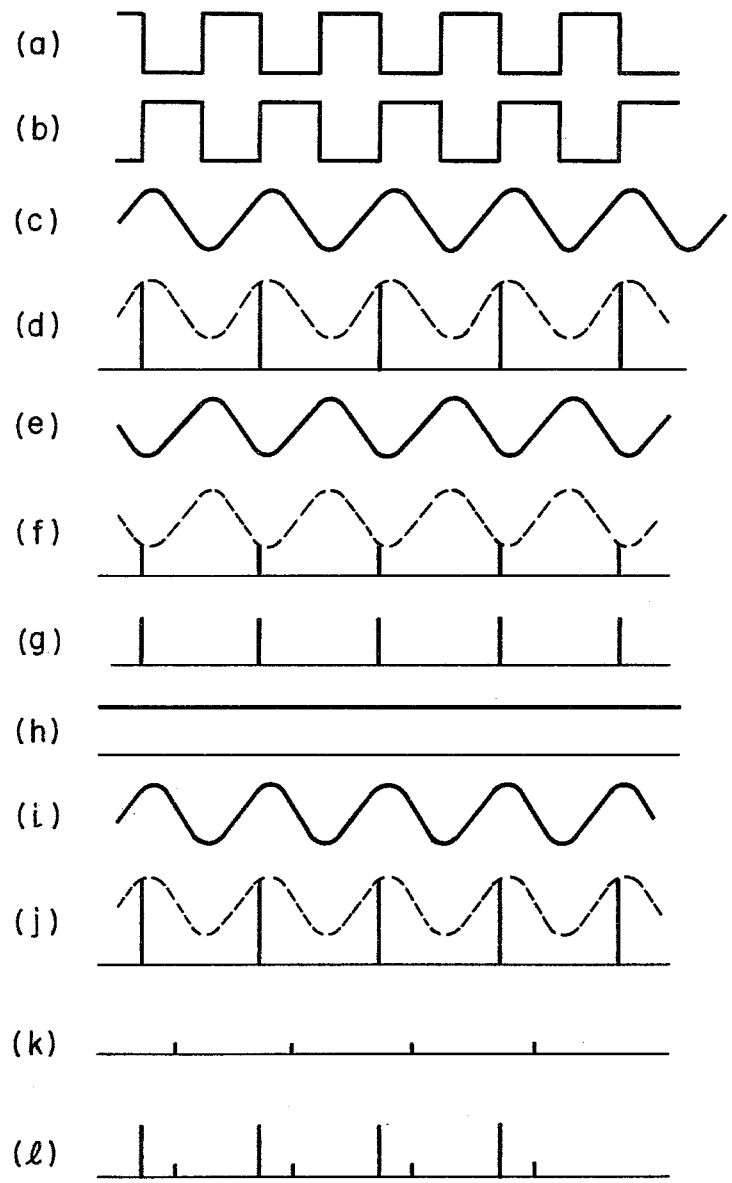
FIG. 2 is a waveform diagram of signals generated at various circuit points of the circuit shown in FIG. 1 to illustrate the operation thereof.
Figure 3:
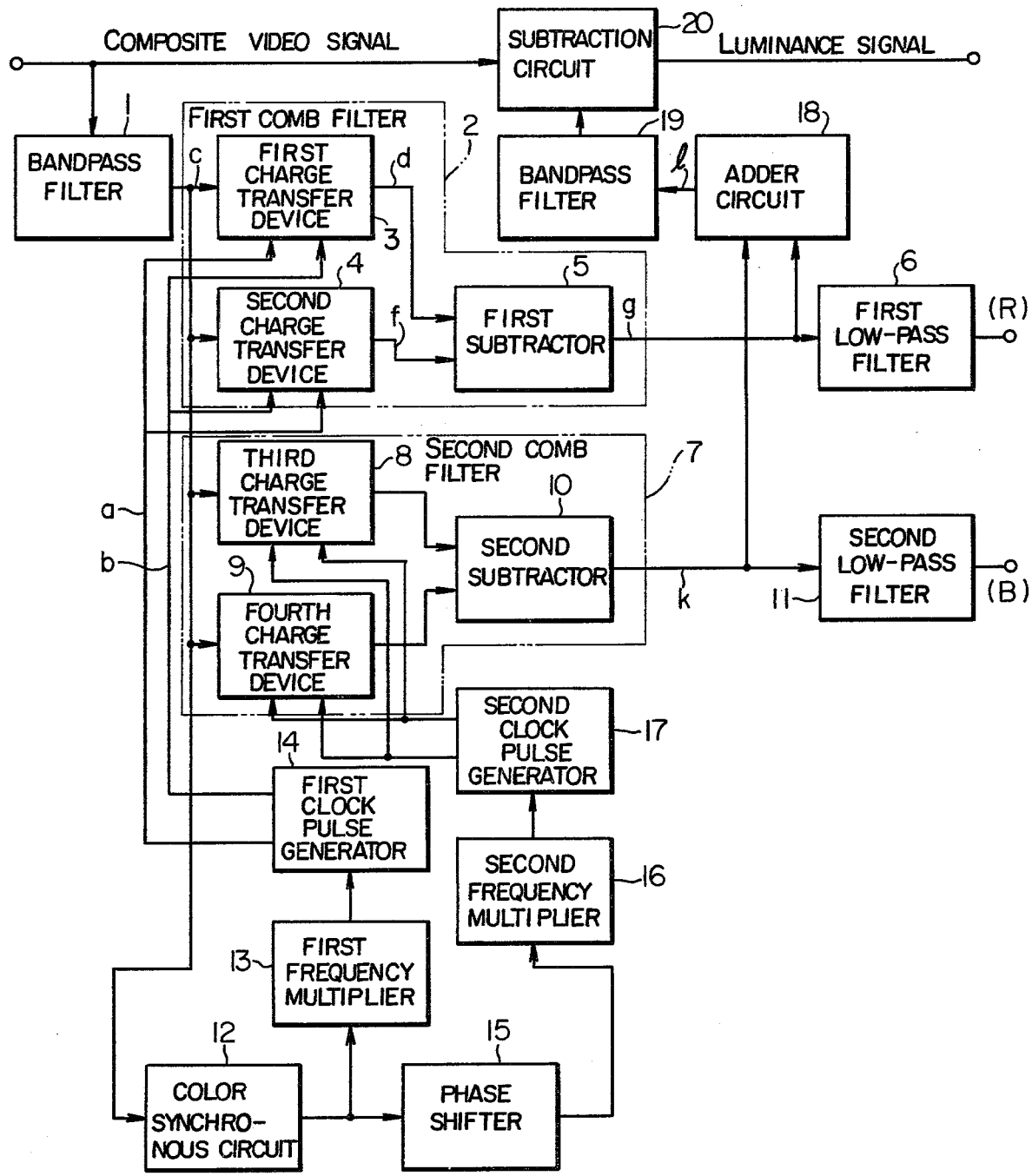
FIG. 3 is a block diagram showing an embodiment of the invention.

FIG. 4 shows a circuit diagram of a main portion of the embodiment shown in FIG. 3. In this circuit, two-phase driven SCCD (Surface Channel Charge Coupled Device) is employed for CTD. Following description is directed to the two-phase driven SCCD used for the second CTD 4. A region 22 of n+ - type formed in an inner surface of a P-type silicon substrate 21 constitutes a source region to which a signal is inputted. Formed on the substrate 21 is an insulation film 23 in which a plurality of electrodes 25 are embedded. Further, a plurality of electrodes 24 are provided on the insulation film 23 between the embedded electrodes 25. The first one of the electrodes 24 as viewed from the source is used as a gate electrode while the embedded electrode 25 next to the gate electrode is used as a sampling gate electrode. A pair of the electrodes 24 and 25 located in succession following to these gate electrodes are connected together so as to be applied with a common potential and used as transfer electrodes. An n+-region 26 formed in the inner surface of the substrate 21 constitutes a drain or output region, wherein the output signal is taken out in a form of a voltage drop across a resistor $R_1$ connected to the n+-region 26. The electrode 24 located nearest to the n+-output region 26 is used as the output electrode. As is known in the art, the transfer electrodes are applied with two clock pulse signals (a) and (b) shown in FIG. 2 and having phase difference of 180° relative to each other. The gate electrode is applied with the pulse signal (b) shown in FIG. 2, while the sampling gate electrode is applied with DC bias voltage $V_c$. Under these conditions, when the pulse signal (b) shown in FIG. 2 is at a high level, potential applied under the gate electrode 24 becomes low sufficiently so that potential well under the sampling gate electrode is filled with electrons to the same potential level as the source. On the other hand, when the level of pulse signal (b) shown in FIG. 2 becomes low, potential under the gate electrode is increased, whereby the region underlying the sampling gate electrode is isolated from the source region, as a result of which the electron charge corresponding to the input signal level at the leading edge of the pulse (b) is sampled at the region below the sampling gate signal. The sampled charge is then successively transferred through the transfer electrodes and finally transferred to the n+-type output region at the moment when a high voltage is applied to the output gate electrode. At that time, a current to offset the electric charge output to the n+-region 26 will flow through the resistor $R_1$. Consequently, pulse-like signal is outputted at the trailing edge of the pulse signal (a) shown in FIG. 2.

In the case of the first CTD 3, the clock pulse (a) shown in FIG. 2 is applied to the gate electrode as well as the output gate electrode. Thus, the electric charge corresponding to the input signal level at the trailing edge of the pulse (a) is sampled and outputted as the pulse-like signal at the trailing edge of the pulse signal (a). In this manner, the sampling is effected with phase difference of 180° between the first and the second CTD's 3 and 4 and the sampled signals are outputted in the same timing as illustrated in FIG. 2. The same applies to the third and fourth CTD's 8 and 9.

Subtraction is effected in a differential amplifier constituted by MOS transistors $Q_1$, $Q_2$ and $Q_3$ and adapted to produce voltage difference between the input signals at the transistors $Q_1$ and $Q_2$. In a similar manner, the subtraction circuit 10 is constituted by MOS transistors $Q_4$, $Q_5$ and $Q_6$. The adder circuit is constituted by MOS transistors $Q_7$, $Q_8$, $Q_9$ and $Q_{10}$ in a well known manner.

The input and output arrangements for SCCD are not restricted to the configuration described above but many other known input and output arrangements may be adopted. Further, although it has been assumed that SCCD is used for CTD in the illustrated embodiment, it is apparent that other devices such as BCCD (Buried Channel Charge Transfer Device) and BBD (Bucket Brigade Device) may be used to the substantially same effect.

It will now be appreciated that the invention has provided a color signal processing circuit which includes two comb filters each constituted by CTD's driven in the charge transfer operation by clock pulse signal having a low frequency such as that of the color subcarrier signal and is capable of producing two demodulated color signals free of the luminance signal component and at the same time reconstructing the modulated color signal free of the luminance component. The reconstructed or reproduced modulated color signal is used to eliminate the modulated color signal mixed in the luminance signal, whereby not only the crosscolor phenomenon but also the dot interference can be effectively inhibited. The color signal processing circuit according to the invention of course utilizes an inherent features of the comb filter circuit such that the luminance signal channel of wide frequency band can be provided, while the required number of CTD stages can be reduced to a minimum thereby to lower the manufacturing costs.

We claim:

1. A circuit arrangement for separating chrominance and luminance signals in a composite video signal of an NTSC system comprising:
   (a) a first bandpass filter for extracting a modulated color signal from said composite video signal;

(b) a first comb filter including a first charge transfer device for sampling and transferring said modulated color signal with use of a first clock pulse signal of the frequency of a color subcarrier signal, a second charge transfer device for sampling said composite video signal with use of a second clock pulse signal having the same frequency as said first clock pulse signal but an opposite phase thereto and delaying the transfer of said sampled signal for a single horizontal scanning period relative to the output signal from said first charge transfer device and a first subtraction circuit for determining arithmetically a difference signal between the output signals from said first and second charge transfer devices;

(c) a second comb filter including a third charge transfer device for sampling said composite video signal with use of a third clock pulse signal having a same frequency as that of said first clock pulse and having a predetermined phase different from that of said first clock signal, a fourth charge transfer device for sampling said modulated color signal with a fourth clock pulse having the same frequency as said third clock pulse signal but an opposite phase thereto and delaying the sampled color signal for the single horizontal scanning period relative to the output signal from said third charge transfer device and a subtraction circuit for arithmetically determining a difference signal between the output signals from said third and fourth charge transfer devices;

(d) an adder circuit for arithmetically determining a sum signal of the output signals from said first and second comb filters;

(e) a second bandpass filter for extracting from said sum signal only the modulated color signal; and (f) a third subtraction circuit for arithmetically determining a difference signal between said composite video signal and said modulated color signal, whereby a demodulated color output signal is obtained from each of the output signals of said first and second comb filters through a low-pass filter, while a luminance output signal is obtained from said third subtraction circuit.

2. A circuit arrangement according to claim 1, wherein said first and second subtraction circuits comprise a first and a second differential amplifier, respectively.

* * * * *